(12) United States Patent
Muramatsu

(10) Patent No.: US 7,284,646 B2
(45) Date of Patent: Oct. 23, 2007

(54) ROTARY MOTION TYPE ONE-WAY CLUTCH

(75) Inventor: Kazuhiko Muramatsu, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 182 days.

(21) Appl. No.: 11/108,645

(22) Filed: Apr. 19, 2005

(65) Prior Publication Data
US 2005/0236247 A1    Oct. 27, 2005

(30) Foreign Application Priority Data
Apr. 23, 2004  (JP) ............................... 2004-128167

(51) Int. Cl.
*F16D 41/066*  (2006.01)
(52) U.S. Cl. .................. 192/45; 192/105 BA
(58) Field of Classification Search ..................... None
See application file for complete search history.

(56) References Cited

U.S. PATENT DOCUMENTS 2,044,197 A * 6/1936 Barthel ........................ 192/45

5,595,273 A * 1/1997 Endoy et al. ................. 192/45
6,530,464 B2 * 3/2003 Ogata et al. ........... 192/113.32

FOREIGN PATENT DOCUMENTS

| JP | 52-100045 A | * | 8/1977 |
| JP | 2004-316887 | | 11/2004 |
| JP | 2004-316891 A | * | 11/2004 |
| WO | WO 2004/072504 A1 | * | 8/2004 |

* cited by examiner

*Primary Examiner*—Rodney H. Bonck
(74) *Attorney, Agent, or Firm*—Miles & Stockbridge PC

(57) ABSTRACT

A rotary motion one way-clutch having an outer race having a cylindrical inner peripheral surface, an inner race formed therein with a cam surface, a rolling element for transmitting a torque between the outer race and the inner race, an urging spring for urging the rolling element, and a weight element for pressing the rolling element in an engaging direction under a centrifugal force, overcoming an urging force of the urging spring, wherein a bearing member having a weight element operating surface for guiding the operation of the weight element and a bearing surface having a bearing action against the cylindrical inner peripheral surface of the outer race is provided between the outer race and the inner race.

21 Claims, 2 Drawing Sheets

ROTARY MOTION TYPE ONE-WAY CLUTCH

BACKGROUND OF THE INVENTION

1. Field of the Invention

The present invention relates to a rotary motion type one-way clutch adapted to be used for a motor-cycle, a snow mobile or the like, which exhibits a one-way clutch function at a rotational speed not less than a predetermined speed.

2. Related Background Art

In general, a one-way clutch is composed of an outer race and an inner race which are rotated, relative to each other, a sprag or a roller for transmitting a torque between the inner race and the outer race, which is meshed with a cam surface formed on a raceway surface of the inner race or the outer race so as to transmit torque in only one direction. Further, the one-way clutch slips in a reverse direction.

Among one-way clutches as mentioned above, there has been known the one in which a roller received in a pocket (recess) formed in either the inner race or the outer race is locked from rotation through such a wedging action that the roller is engaged with a wedge part formed on the outer periphery of the inner race, depending upon a direction of rotation thereof.

For example, Japanese Patent Application No. 2003-344618 discloses such a configuration that a roller and a weight element are accommodated in a recess formed in the inner race, and the roller is locked under wedge action in the clockwise rotation of an outer race, being pressed by the weight element under centrifugal action, in order to lock the outer race from rotating, relative to the inner race.

In the Japanese Patent Application No. 2003-344618, the inner race is formed at its outer periphery with a plurality of recesses, having a bearing surface and a weight element operating surface for the outer race, in parts of the outer periphery of the inner race.

However, the configuration disclosed in the Japanese Patent Application No. 2003-344618 inevitably causes the shape of the inner race to be complicated since the inner race is formed with both bearing surface and weight element operating surface. Further, since the bearing surface is made of one and the same material as that of the inner race, the specification required for a bearing have not always been satisfied.

SUMMARY OF THE INVENTION

Accordingly, an object of the present invention is to provide a rotary motion type one-way clutch composed of an inner race which has a simplified shape, and a bearing surface which is made of a material different from that of the inner race in order to optimize the bearing surface.

To the end, according to the present invention, there is provide a rotary motion type one-way clutch comprising an outer race having a cylindrical inner peripheral surface, an inner race formed therein with a cam surface, a rolling element for transmitting a torque between the outer race and the inner race, an urging spring for urging the rolling element, and a weight element for pressing the rolling element in an engaging direction, overcoming an urging force of the urging spring when an centrifugal force is applied to the weight element, characterized by a bearing member formed therein with a weight element operating surface for guiding the operation of the weight element, and a bearing surface having bearing action for the cylindrical inner peripheral surface of the outer race.

According to the present invention having a configuration as sated above, there are provided the following advantages:

Since it is not required to provide a weight element acting surface and a bearing surface in the inner race, the shape of the inner race can be simplified so as to reduce the manufacturing cost of the inner race. Further, the bearing surface is formed, being separated from the inner race, and accordingly, it may be formed of a material which is different from that of the inner race and which is appropriate for a bearing, thereby it is possible to optimize the bearing surface.

Further, the other advantages are as follows:

With the provision of the bearing member, the weight element can be smoothly operated;

Since the bearing member is capable of serving as a spring holder, no inclusive holder therefor is required.

Since the bearing member calks a part of the holder which is therefore secured, and has a through-hole which axially pierces, it is possible to simply hold a side plate.

Since the bearing member has a stopper portion which for limiting an urging spring from radially displacing under a centrifugal force, it is possible to prevent a rolling element from being jammed between the inner race and the outer race so as to hinder the operation of the one-way clutch.

In this specification, the term "rotary motion type" is construed as such that the function of the one-way clutch can be ensured during rotation at a speed exceeding the above-mentioned speed. However, there may possibly be caused such a case that the function of the one-way clutch is also exhibited at a speed not greater than a predetermined speed but above a low speed range. Further, the "predetermined speed" is optimumly determined depending upon a mass of the weight element, a distance from the center of the weight element and an inclined angle of the weight element operating surface.

Further, in this specification, the term "weight element operating surface" is construed as a surface along which the weight element rolls or slips toward the outer diametrical side so as to be guided, and which is made into press-contact with the roller so as to displace the roller up to a roller meshing position. The "weight element operating surface" is preferably inclined so that the circumferential width of the pocket becomes narrower and narrower in a radially outward direction.

DESCRIPTION OF PREFERRED EMBODIMENTS

Figure 1:
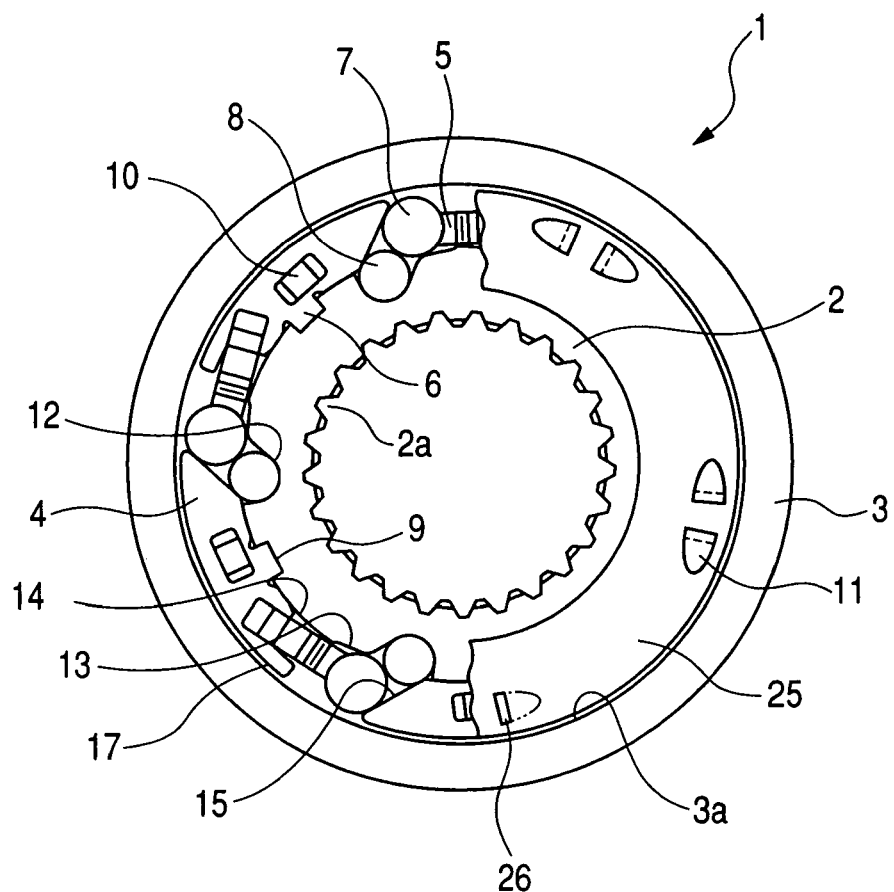
FIG. 1 is a front view illustrating a rotary motion type one-way clutch in an embodiment of the present invention.

Detailed explanation will be made of an embodiment of the present invention with reference to the accompanying drawings in which like reference numerals are use to denote like parts.

Referring to FIG. 1 which is a front view illustrating a rotary motion type one-way clutch in an embodiment of the present invention, the rotary motion type one-way clutch 1 is composed of an inner race 2 which is formed in its inner peripheral surface with splines 2a and serving as a hollow shaft adapted to be fitted on a drive shaft which is not shown, and an outer race 3 arranged, diametrically outside of and coaxially with the inner race 2, so as to be rotatable, relative to the inner race 2.

Figure 2:
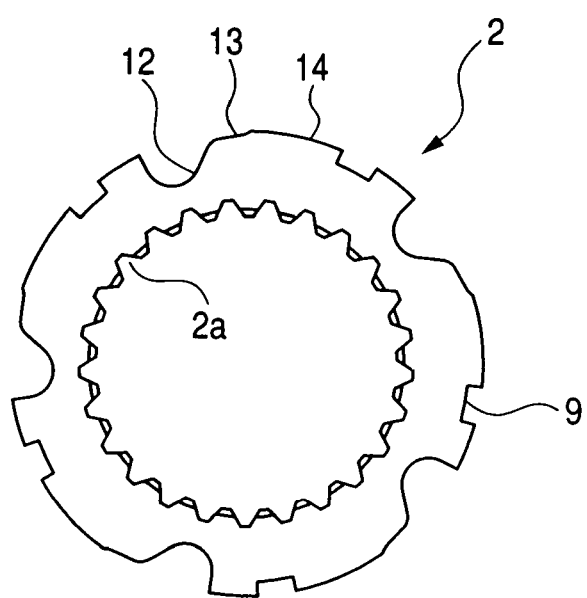
FIG. 2 is a front view illustrating an inner race in the rotary motion type one-way clutch in the embodiment of the present invention.

Referring to FIG. 2 which is a front view illustrating the inner race 2, the inner race 2 is formed therein with a plurality of recesses 12 opened to an inner peripheral surface 3a of the outer race 3, cam surfaces 13 adjacent to the recesses 12, non-wedge action surfaces 14 adjacent to the cam surfaces 13, each recess 12, each cam surface 13 and each non-wedge action surface 14 being bundled in one of sets which are equally allocated in a circumferential direction. The recesses 12 receive the weight elements 8 seated therein.

The inner race 2 is formed in its outer peripheral part with depressions 9 adapted to be fitted therein with fitting protrusions 6 of bearing members 4 which will be detailed later. The depressions 9 are formed between the sets each composed of the recess 12, the cam surface 13 and the non-wedge action surface 14.

Figure 3:
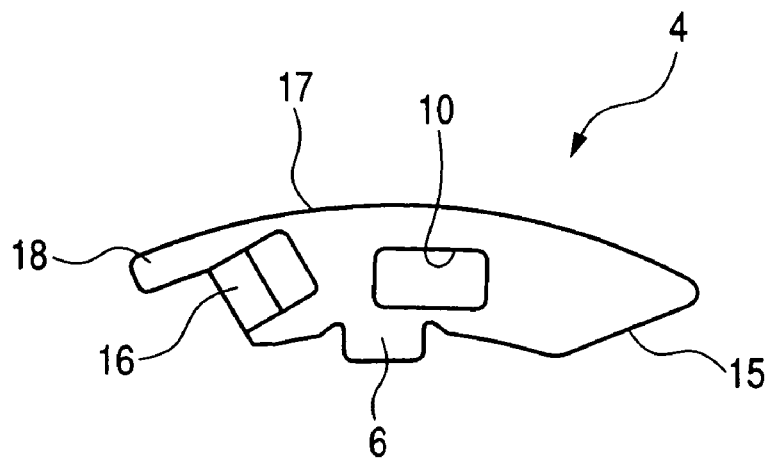
FIG. 3 is a front view illustrating a bearing member in the rotary motion type one-way clutch in the embodiment of the present invention.

Referring to FIG. 3 which is a front view illustrating the bearing member in the embodiment of the present invention, the bearing member 4 which is provided, being separated from the inner race 2, has an arcuate shape as a whole, having an arcuated outer peripheral surface which serves as a bearing surface 17 having a bearing function with respect to the inner peripheral surface 3a (Refer to FIG. 1) of the outer race 3a. The bearing member 4 is formed on its inner peripheral surface with protrusions 6 radially inward projected. When the protrusions 6 are fitted in the recesses 9 of the inner race 2, the bearing members 4 are fixed so as to be unmovable in the circumferential direction, relative to the inner race 2.

Further, the bearing member 4 is formed in its circumferentially intermediate part with a through hole 10 which axially pierces. Ring-like side plates 25 for preventing the component parts from coming off in the axial direction are provided on opposite sides of the rotary motion type one-way clutch 1, as viewed in the axial direction thereof.

Referring to FIG. 1 which also shows the front side plate 25 as viewed being partly broken, the side plate 25 has calking parts 11 for axially holding accordion springs 5 and the like, which are inserted in the through-holes 10 of the bearing members 4, and then are inserted in through-holes 26 in the other side plate 25 before it is calked. FIG. 1 shows this condition, and also shows such a condition that the other side plate 25 is arranged underneath the FIG. 1.

The bearing member 4 is formed at its circumferentially one end part with an attaching part 16 on which an end part of the urging spring, that is, the accordion spring 5 is fitted, and is formed with a stopper protrusion 18 circumferentially extended, radially outward of the attaching part 16. The stopper protrusion 18 is provided so as to restrain the accordion spring 5 from being displaced radially outward under a centrifugal force.

The bearing member 4 is formed at the circumferential other end thereof with a weight element operating surface 15 for guiding the operation of a substantially cylindrical weight element 8. The weight element operating surface 15 is inclined so that it becomes narrower from the inner diameter side to the outer diameter side. Accordingly, the weight element 8 is guided along the weight element operating surface 15 radially outward so that the weight element 8 presses the roller 7 in a direction in which the roller 7 is engaged with the cam surface 13.

Further, in addition to the accordion spring, there may be used a coil spring having an elliptic cross-sectional shape, as the urging spring 5 for preventing the roller 7 from skewing.

The accordion spring 5 urges the roller 7 in a direction in which the depth of the cam surface 15 becomes deeper, that is, in a direction toward the recess 12, or in a disengaging direction in which the roller 7 is not meshed between the cam surface 13 and the cylindrical inner surface of the outer race 3 so as to cause the one-way clutch 1 to slip.

Next, explanation will be hereinbelow made of the operation of the rotary motion type one-way clutch 1 in this embodiment. FIG. 1 shows such a condition that the roller 7 has not yet been engaged (a disengaging condition). In this rotary motion type one-way clutch 1, the rollers 7 do never transmit a torque even in either of directions of relative rotation between the inner race and the outer race in a low speed range from a zero speed. FIG. 1 shows this condition, that is, slight gaps are present between the inner peripheral surface 3a of the outer race 3 and the rollers 7. Further, each weight element 8 is located at a substantially innermost part of the associated recess 12.

When the speed increases from the disengaging condition, the weight element 8 is displaced under a centrifugal force diametrically outward along the circumferential end surface which is inclined so that the circumferential width is gradually narrowed diametrically outward, that is, along the weight element operating surface 15, and accordingly, a centrifugal force exerted to the weight element 8 is also applied to the roller 7 in addition to the centrifugal force directly applied to the roller 7 itself, that is, there is effected such a circumferential force that the roller 7 is circumferentially pushed up to the meshing position while it is displaced in the engaging direction up to a position where the roller 7 can be engaged with the cam surface 13.

Further, when the speed exceeds a predetermined value, a sufficient pressing force is applied to the roller 7, resulting in occurrence of a condition in which the rotary motion type one-way clutch can exhibits its function, that is, in a condition in which it can be locked up. That is, in this condition, in such a case that inner race 2 is fixed as shown in FIG. 1, when the outer race 3 is rotated leftward as viewed in this figure, a slipping condition (disengaging condition) is effected, but when the outer race 3 is rotated rightward as viewed in this figure, the weight element 8 comes away from the recess 2 and displaces toward the outer diameter side along the weight element operating surface 15 so as to effect such a meshing condition that the roller 7 is pressed against the cam surface 17, overcoming the urging force of the accordion spring 5, resulting in torque transmission between the inner race and the outer race.

By the way, in order to prevent the weight element 8 from being caught between the roller 7 and the weight element operating surface 15, the weight element operating surface 15 is set at a predetermined wedge angle which is defined between a. tangential line at a contact point between the weight element 8 and the roller 7, and the weight element operating surface 15 and which is set to a value depending upon a diametrical ratio between the weight element 8 and the roller 7.

The non-wedge action surface 14 is formed diametrically outward from each of the cam surfaces 13, on the side remote from the weight element 8, being inclined greatly in comparison with the cam surface 13. The roller 7 is prevented from being jammed into the non-wedge action surface.

Although the bearing member 4 can be made of one and the same material as that of the inner race 2 which is usually made of steel, it may be made of a material suitable for a bearing, different from the material of the inner race 2. Further, although it may be formed by grinding or the like, it is preferably formed by sintering since its shape is complicated. Further, since the bearing member 4 is fixed to the inner race 2 through the intermediary of the protrusion 6, it is also substantially fixed to the recess 12.

As stated above, with the provision of the bearing members 4, since the outer peripheral shape of the inner race 2 can be simplified so that it is possible to lower the necessity of relieving the inner race by polishing, cutting, wire-cut or the like, the time of working the inner race and affection by deformation due to heat-treatment can be reduced.

Figure 4:
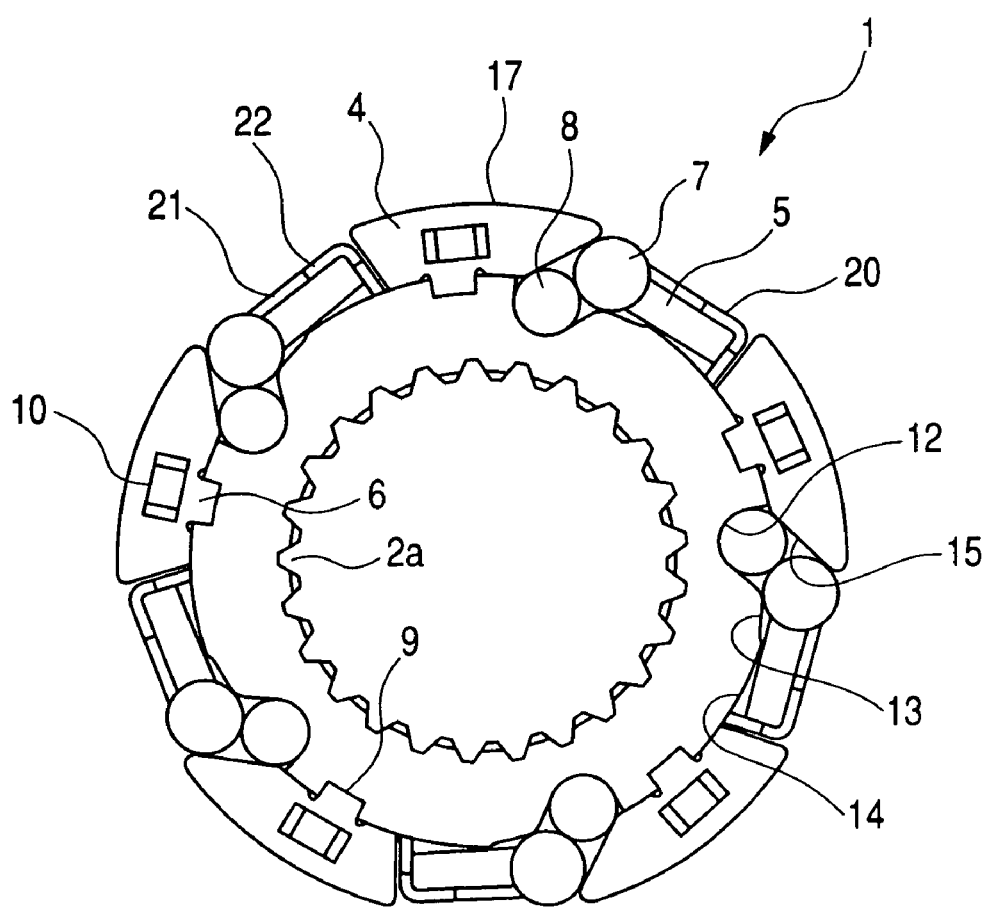
FIG. 4 is a front view illustrating a rotary motion type one-way clutch in a modification form of the embodiment of the present invention.

Next, explanation will be made of a modification form of the embodiment of the present invention with reference to FIG. 4 which is a front view illustrating a rotary motion type one-way clutch in a modification form of the embodiment of the present invention. Since the basic configuration of this rotary motion type one-way clutch is the same as that shown in FIG. 1, explanation of the basic configuration will be omitted. It is noted here that the outer race 3 is not shown in FIG. 4.

In this modification, no attaching part 16 to which one end part of the accordion spring 5 is attached, is formed in the bearing part 4. Thus, a holder 21 is provided for holding the accordion spring 5. The holder 21 is formed of a substantially ring-like plate member, and is located on the other side as faced to FIG. 4. Further, the holder 21 is secured to the inner race 2 or the bearing member 4.

The holders 21 are arranged at predetermined intervals in the circumferential direction, each incorporating an angle part 20 to which one end part of the accordion spring 5 is held. In this modification, since it is possible to eliminate the necessity of provision of the attaching part 16 to which the one end part of the accordion spring 5 is attached, and the stopper protrusion 18 circumferentially extended and provided radially outward of the attaching part 16 in the bearing member 4, the shape of the bearing member 4 can be simplified.

Further, in this modification, although no part corresponding to the stopper protrusion 18 is in particular formed in the bearing member 4, an axially one end part 22 of the angle part 20 serves as the stopper protrusion 18 so as to restrain the accordion spring 5 from being displaced radially outward under a centrifugal force.

It is noted that although the weight element may be made of steel, copper, steel alloy, aluminum, synthetic resin or the like, it is preferably made of steel or the like having a large specific weight since a centrifugal force exerted to a unit volume become larger. If it is so, the size of the one-way clutch can be reduced, and a meshing condition can be obtained even at a low speed while the diameter of the weight element 8 can be reduced.

Although the explanation has been made of the embodiment of the present invention in which the cylindrical rollers are used as the rolling elements, spherical elements may also be used. Further, the weight elements have not to be cylindrical rollers, but they may be spherical elements, Further, as to the combination of the rolling elements and the weight elements, both may be rollers or spherical elements, or either one of them may be a roller but the other one of them be a spherical element.

Further, in the embodiment as stated above, although six bearing members are provided at equal intervals in the circumferential direction, the number of the bearing members may be arbitrarily changed, depending upon a required torque capacity or the like, that is, it may three or four other than six. However, it is preferable to equally allocate the pockets in the circumferential direction, irrespective of the number thereof.

Further, although the diameter of the rollers is larger than the diameter of the weight elements, this magnitude correlation thereof can be arbitrarily set in accordance with a use condition (for example, a rotational speed range during operation).

Accordingly, they may have an equal size, or the diameter of the weight elements may be set so as to be larger than that of the rollers.

The rotary motion type one-way clutch according to the present invention can be also applied in a four wheel vehicle, in addition to a motor cycle, a snow mobile or the like.

What is claimed is:

1. A rotary motion type one-way clutch comprising an outer race having a cylindrical inner peripheral surface, an inner race having formed therein a cam surface, a rolling element which transmits a torque between the inner race and the outer race, an urging spring which urges the rolling element, and a weight element which presses the rolling element in an engaging direction under a centrifugal force, overcoming an urging force of the urging spring, characterized in that a bearing member including a bearing surface having a bearing action against the inner peripheral surface of the outer race is provided between the inner race and the outer race, and the weight element and a rolling surface of the rolling element are guided on a guide surface of the bearing member.

2. A rotary motion type one-way clutch as set forth in claim 1, characterized in that the bearing member is formed with a spring attaching part to which the urging spring is attached.

3. A rotary motion type one-way clutch as set forth in claim 1, characterized in that the bearing member is formed with a protrusion fitted in a recess formed in the inner race so as to prevent rotation of the bearing member relative to the inner race.

4. A rotary motion type one-way clutch as set forth in claim 1, characterized in that the bearing member is formed therein with a through-hole axially piercing therethrough, for calking a part of a holder which is therefore secured.

5. A rotary motion type one-way clutch as set forth in claim 1, characterized in that the bearing member has a stopper part disposed to restrain the urging spring from being displaced radially outward under a centrifugal force.

6. A rotary motion type one-way clutch as set forth in claim 1, characterized in that the rolling element is roller.

7. A rotary motion type one-way clutch as set forth in claim 1, characterized in that the rolling element is a spherical element.

8. A rotary motion type oneway clutch as set forth in claim 1, characterized in that the weight element is a roller.

9. A rotary motion type oneway clutch as set forth in claim 1, characterized in that the weight element is a spherical element.

10. A rotary motion type one-way clutch comprising an outer race having a cylindrical inner peripheral surface, an inner race having formed therein a cam surface, a rolling element which transmits a torque between the inner race and the outer race, an urging spring which urges the rolling element, and a weight element which presses the rolling element in an engaging direction under a centrifugal force, overcoming an urging force of the urging spring, characterized in that a bearing member is provided between the inner race and the outer race, the bearing member having a weight element operating surface which guides the operation of the weight element, and a bearing surface having a bearing action against the inner peripheral surface of the outer race, and further characterized in that the bearing member is formed with a protrusion fitted in a recess formed in the inner race so as to prevent rotation of the bearing member relative to the inner race.

11. A rotary motion type one-way clutch as set forth in claim 10, characterized in that the bearing member is formed with a spring attaching part to which the urging spring is attached.

12. A rotary motion type one-way clutch as set forth in claim 10, characterized in that the bearing member is formed therein with a throughhole axially piercing therethrough, for calking a part of a holder which is therefore secured.

13. A rotary motion type one-way clutch as set forth in claim 10, characterized in that the bearing member has a stopper part disposed to restrain the urging spring from being displaced radially outward under a centrifugal force.

14. A rotary motion type one-way clutch as set forth in claim 10, characterized in that the rolling element is roller.

15. A rotary motion type one-way clutch as set forth in claim 10, characterized in that the rolling element is a spherical element.

16. A rotary motion type one-way clutch as set forth in claim 10, characterized in that the weight element is a roller.

17. A rotary motion type one-way clutch as set forth in claim 10, characterized in that the weight element is a spherical element.

18. A rotary motion type one-way clutch comprising an outer race having a cylindrical inner peripheral surface, an inner race having formed therein a cam surface, a rolling element which transmits a torque between the inner race and the outer race, an urging spring which urges the rolling element, a weight element which presses the rolling element in an engaging direction under a centrifugal force, overcoming an urging force of the urging spring, and side plates disposed at opposite axial ends of the one-way clutch, characterized in that a bearing member provided between the side plates and between the inner and outer races is attached to the inner race so as to be rotatable therewith, said bearing member having a guide surface which guides the operation of the weight element, and a bearing surface having a bearing action against the inner peripheral surface of the outer race.

19. A rotary motion type one-way clutch as set forth in claim 18, characterized in that the weight element and a rolling surface of the rolling element are guided by said guide surface of the bearing member.

20. A rotary motion type one-way clutch as set forth in claim 18, characterized in that the bearing member is formed with a protrusion fitted in a recess formed in the inner race so as to prevent rotation of the bearing member relative to the inner race.

21. A rotary motion type one-way clutch as set forth in claim 18, characterized in that said bearing member has a through-hole, and said side plates are coupled to one another via a member inserted in said through-hole.

* * * * *